(12) United States Patent
Karmalawy

(10) Patent No.: US 6,590,214 B1
(45) Date of Patent: Jul. 8, 2003

(54) COLLIMATOR EXCHANGE SYSTEM

(75) Inventor: Moataz Karmalawy, Fremont, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/237,380

(22) Filed: Jan. 26, 1999

(51) Int. Cl.⁷ .................................................. G01T 7/08
(52) U.S. Cl. ............................... 250/363.1; 250/363.01
(58) Field of Search ........................ 250/363.1, 363.01, 250/363.05, 363.04, 363.08; 378/147, 148

(56) References Cited

U.S. PATENT DOCUMENTS

| | | | |
|---|---|---|---|
| 3,982,133 A | | 9/1976 | Jupa et al. |
| 4,109,155 A | * | 8/1978 | Tschunt et al. ............. 250/505 |
| 4,129,784 A | | 12/1978 | Tschunt et al. |
| 4,865,284 A | * | 9/1989 | Gosis et al. ................ 248/187 |
| 5,097,131 A | * | 3/1992 | Plummer et al. ...... 250/363.08 |
| 5,146,094 A | | 9/1992 | Stark |
| 5,210,422 A | | 5/1993 | Kurakake et al. |
| 5,519,223 A | | 5/1996 | Hug et al. |

FOREIGN PATENT DOCUMENTS

JP  57-161575  10/1982
JP  2-263185  10/1990

OTHER PUBLICATIONS

GE Medical Systems: "S8003WF/WG Millenium MG", May, 1997. p. 1.

Park Medical Systems, Inc. Company bochure. pp. 1–8.

* cited by examiner

*Primary Examiner*—Constantine Hannaher
*Assistant Examiner*—Otilia Gabor
(74) *Attorney, Agent, or Firm*—Eugene E. Clair

(57) ABSTRACT

An apparatus and method for the automated positioning of a collimator exchange assembly with a gamma camera system is described. A collimator exchange assembly is coupled to a base. During operation of the gamma camera system, the exchange assembly is positioned to the side of the gamma camera system. Prior to transferring collimators between the exchange assembly and the detector heads of the gamma camera system, the exchange assembly rotates into close proximity with the gamma camera system to allow the transfer of collimators between the exchange assembly and the gamma camera system. Once the collimators have been transferred, the exchange assembly then rotates back to the side of the gamma camera system such that the exchange assembly does not interfere with the gamma camera system during the gamma camera study.

18 Claims, 7 Drawing Sheets

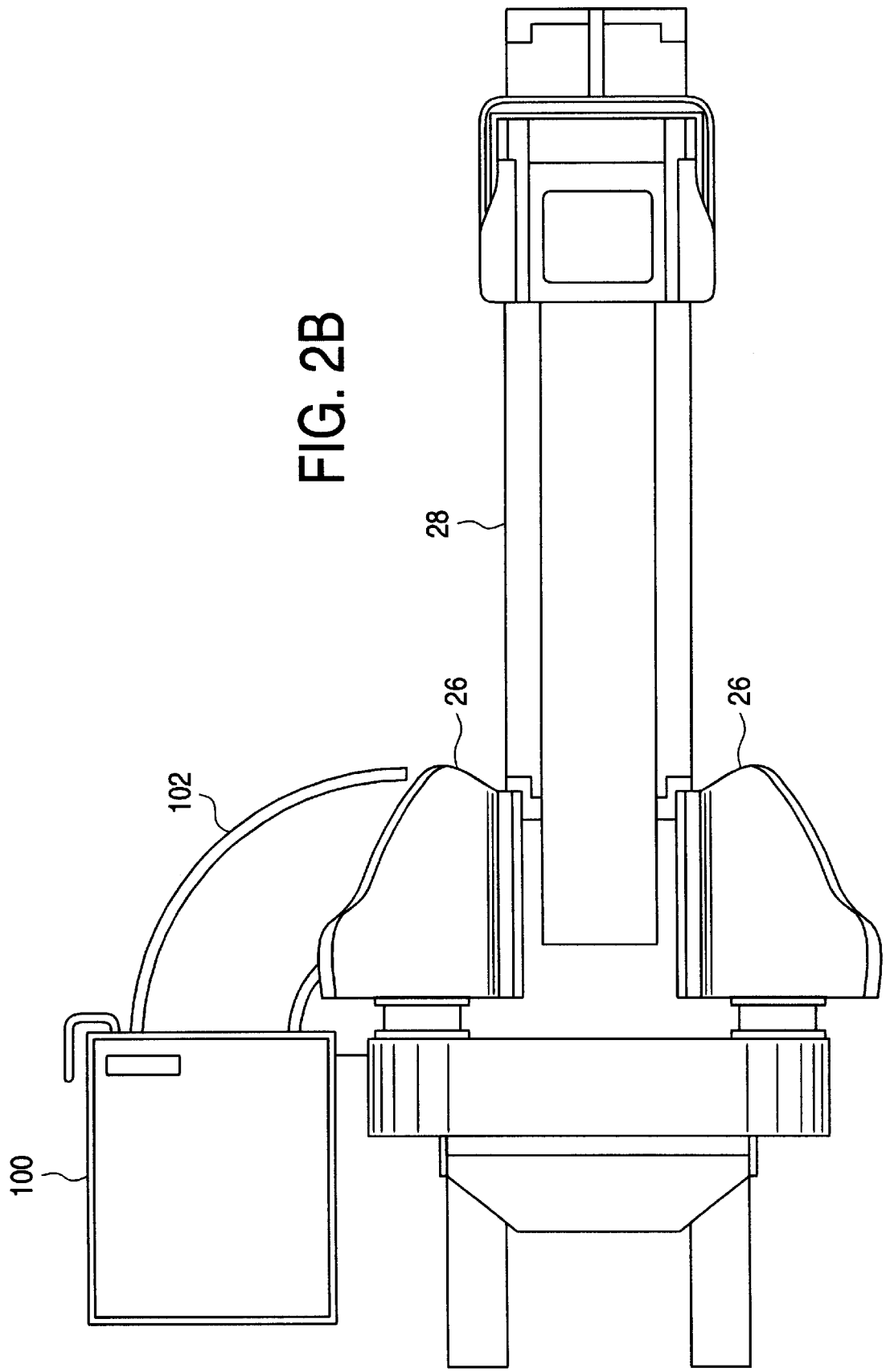

COLLIMATOR EXCHANGE SYSTEM

RELATED PATENTS AND APPLICATIONS

The present invention is related to the U.S. Pat. No. 5,519,223, entitled "Apparatus and Method for Automated Collimator Exchange" issued to Hug et al. on May 21, 1996, and assigned to the assignee of the present invention.

BACKGROUND OF THE INVENTION

1. Field of the Invention

The present invention relates to the field of gamma cameras used in nuclear medicine. More specifically, the present invention relates to the field of collimator exchange mechanisms for exchanging collimator devices used in conjunction with gamma camera detector heads in clinical imaging sessions.

2. Description of the Related Art

Nuclear or scintillation cameras (also called gamma cameras) are responsive to radiation emitted from a radiopharmaceutical injected into a patient during an imaging study. A radiopharmaceutical is typically selected that will target a particular organ or tissue of interest. In computed tomography studies, a detector head (or pair of heads) revolves around the patient and collects the emissions at various angles in order to generate an image of the targeted organ or tissue. In total body studies, the detectors may translate at a fixed or variable altitude along the patient.

In Emission Computed Tomography (ECT) studies, the image data collected at each angle is merged together into a database that is representative of a three dimensional image of the targeted organ or tissue by a mathematical procedure called reconstruction tomography. A computer process and system perform the image data collection and tomography, and the resultant images may be displayed in a variety of fashions on a computer controlled display screen. Gamma camera detectors are also used in many types of studies that do not employ tomography for image generation, such as total body studies.

Each detector head of a gamma camera utilizes a collimator placed in front of the detector mechanism to respond to the incident emissions. The collimator is a device for collimating the incident radiation emissions and for filtering out certain types of unwanted radiation emissions. A collimator is typically manufactured from lead material and is composed of an array of parallel tubes and as such resembles a lead "honey comb." Each individual collimator may weigh from 100 to 250 pounds or more and is mounted on the receiving end of the gamma camera detector to cover the imaging surface. Each collimator must be securely fastened to the detector head during gamma camera studies to prevent collimator separation from the imaging surface as the detector heads revolve or rotate.

Different collimators have particular characteristics suited to the patient study and the energy of the radiation emissions from the ingested radiopharmaceutical. For instance, some collimators are better suited for gamma studies of a given energy range, a given emission exposure duration, or a given radiopharmaceutical. As such, there is a need to exchange collimators associated with the detector heads for different ECT or total body studies. It would be advantageous, then, to provide an automated mechanism for quickly and correctly exchanging collimators associated with the camera detectors in between gamma camera studies. The present invention provides such capability.

In the prior art, collimators were mounted on trays, trolleys, or carts that were manually positioned or aligned adjacent to a detector head and then manually transferred and fastened to the camera. The manual positioning and/or transferring of the collimators required a great deal of manual exertion due to the extreme weight and awkward size of the collimators. The typical gamma camera technicians often could not perform the exchange process alone and required additional personnel to perform the manual exchange. Not only did the manual exchange require additional time and personnel (adding to the overall expense of the gamma camera study), but by using manual alignment and exchange means there was a risk of the collimators being installed improperly or misaligned. These factors contribute to the quality, reproducibility, and precision of data collected (and the resultant image) during a gamma camera study.

U.S. Pat. No. 5,519,223, issued to Hug et al. on May 21, 1996, and assigned to the assignee of the present invention, provides for the automatic exchange of one or two collimators for a camera system with a dual detector head arrangement. The exchange assembly is stored to the side of the gantry structure during a gamma camera study and must be manually positioned adjacent to the gantry structure before the collimator exchange can occur. Once the exchange assembly is in position, a drawbridge is lowered to extend within the gantry and a carriage rolls along the drawbridge to position itself within the pair of detector heads on the gantry structure. The collimators are then transferred from the detector heads to the carriage. Once the collimators have been transferred to the carriage, the carriage rolls back along the drawbridge into the exchange assembly and unloads the collimators. An elevator repositions the then empty carriage within the exchange assembly, and new collimators are loaded onto the carriage. The loaded carriage then rolls back across the drawbridge into the gantry structure and transfers the new collimators to the detector heads before returning to the exchange assembly. Once the collimators have been exchanged, the drawbridge is raised and the exchange assembly is manually moved away from the gantry structure so that the gamma camera study may continue.

It would be advantageous to automate the initial alignment of the exchange assembly with the gantry structure in preparation of the exchange of collimators and to further reduce operator interaction. An automated positioning and alignment of the exchange assembly with the gantry structure will eliminate the need for the gamma camera technician to manually position the exchange assembly near the gantry structure. Further, an automatic positioning of the exchange assembly will result in a more consistent alignment process by consistently returning the exchange assembly to the same position for the exchange process. Thus, an automated positioning of the exchange assembly with the gantry structure in preparation for the exchange of collimators will provide a more cost-effective and efficient method of exchanging collimators, while also improving the quality and reproducibility of data collected during a gamma camera study.

Further, it would be advantageous to provide an apparatus and method that simplifies the automatic collimator exchange itself by eliminating the need for a drawbridge, elevator, and carriage within the exchange assembly. The initial automated positioning of the exchange assembly will allow the exchange assembly to be more closely aligned with the detector heads for the collimator exchange, thus eliminating the need for a drawbridge. By storing the collimator pairs within the exchange assembly such that the position of each collimator pair corresponds to the operating position of the detector heads when used with that particular pair of collimators, the collimators may slide directly from their storage rack within the exchange assembly to the detector heads without the use of a drawbridge or carriage. The simplified exchange assembly of the present invention eliminates the need for a drawbridge, elevator, and carriage, while automating the initial positioning of the exchange assembly.

SUMMARY OF THE INVENTION

An apparatus and method for the automated positioning of a collimator exchange assembly with a gamma camera system is described. The present invention includes a collimator exchange assembly coupled to a base. In particular embodiments, during operation of the gamma camera system, the exchange assembly is positioned to the side of the gamma camera system. Prior to transferring collimators between the exchange assembly and the detector heads of the gamma camera system, the exchange assembly rotates into close proximity with the gamma camera system to allow the transfer of collimators between the exchange assembly and the gamma camera system. Once the collimators have been transferred, the exchange assembly then rotates back to the side of the gamma camera system such that the exchange assembly does not interfere with the gamma camera system during the gamma camera study.

The exchange assembly includes a storage rack having multiple parallel and stacked drawers for holding collimators. Each collimator pair is stored within the exchange assembly such that its relative position within the exchange assembly corresponds with the operating position of the detector heads when that particular collimator pair is in use. Once the exchange assembly is in position for the collimator transfer, the collimator pair slides from their respective drawers within the exchange assembly directly onto the detector heads of the gamma camera system.

DESCRIPTION OF THE DRAWINGS

FIG. 2B is a top view of the exchange assembly and gantry structure illustrated in FIG. 2A.

DETAILED DESCRIPTION OF THE INVENTION

An apparatus and method for the automated positioning of a collimator exchange assembly with a gamma camera system is described. In the following detailed description of the present invention, numerous specific details are set forth in order to provide a thorough understanding of the present invention. However, it will be obvious to one skilled in the art that the present invention may be practiced without these specific details. In other instances, well-known electronics, methods, procedures, components, and circuits have not been described in detail so as to not unnecessarily obscure aspects of the present invention.

The present invention describes an apparatus and method for positioning a collimator exchange assembly (also referred to as a collimator exchanger, exchange device, exchange mechanism, or exchange unit) with a gamma camera system such that a pair of collimators may be transferred between the collimator exchange assembly and a gamma camera system. Although the present invention is described for use with a dual detector head gamma camera system, a single detector head gamma camera system may also utilize the present invention. Furthermore, although the present invention describes the transfer of collimators from both detector heads of a dual detector head gamma camera system, the present invention may also be used to transfer a collimator from only one of the two detector heads.

Figure 1A:
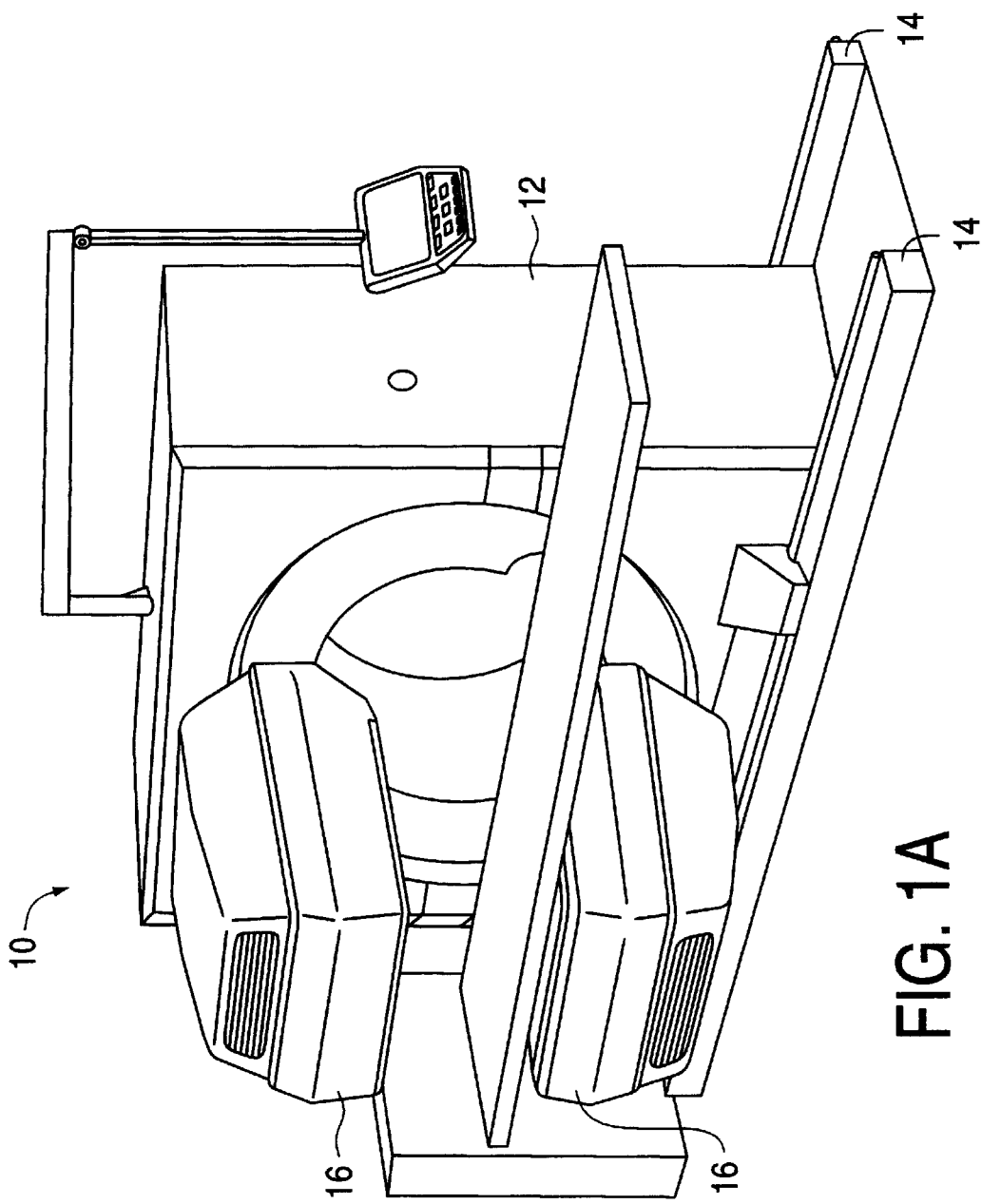
FIG. 1A is a pictorial illustration of an open gantry structure with dual detector heads that may be used with the exchange assembly of the present invention.
Figure 1B:
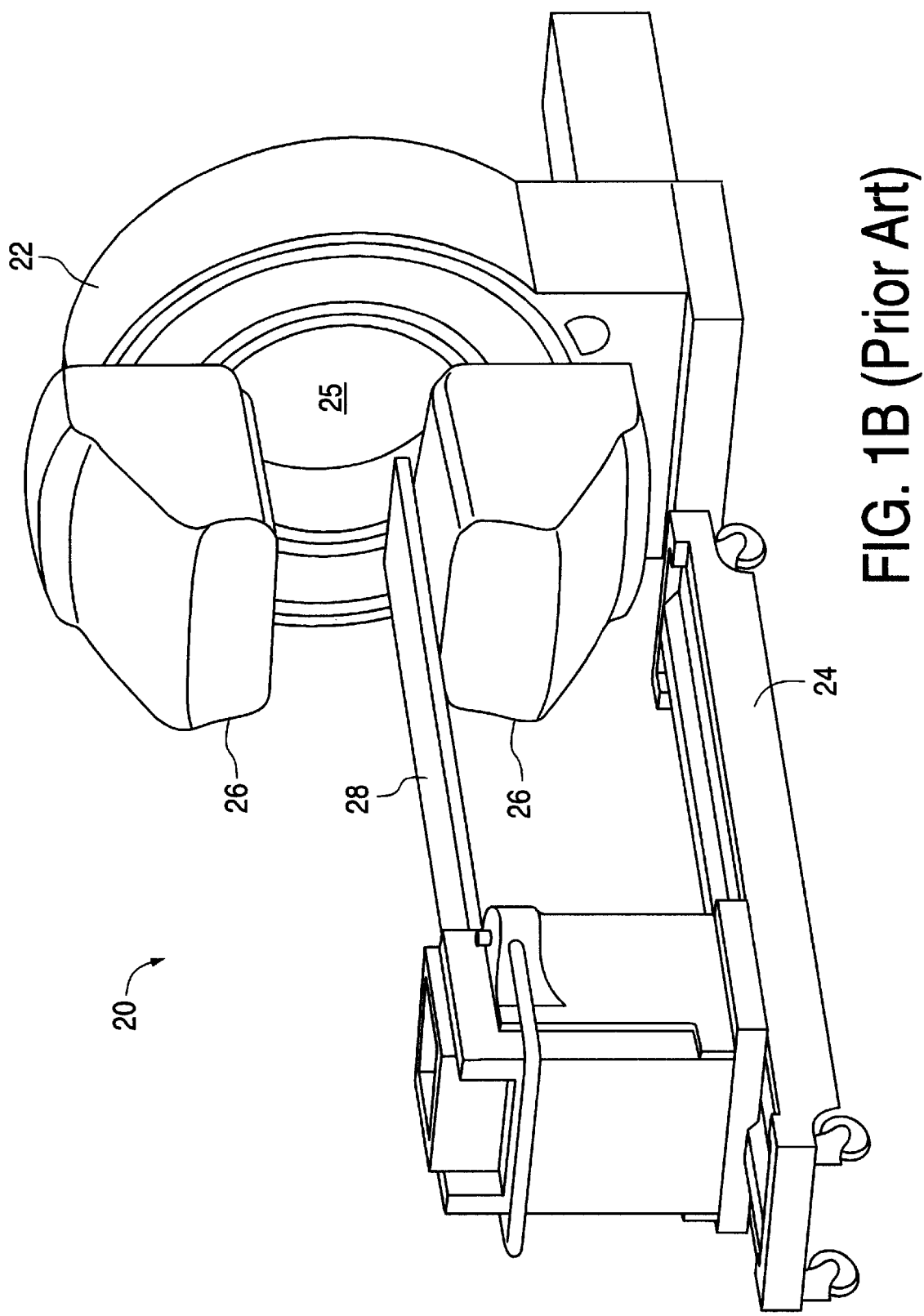
FIG. 1B is a pictorial illustration of a closed gantry structure with dual detector heads that may be used with the exchange assembly of the present invention.

The present invention may be used with both an open gantry structure (see FIG. 1A) and a closed gantry structure (see FIG. 1B). Both of the gantry structure systems 10 and 20 are dual detector head systems. The gantry structures 12 and 22 support the detector heads 16 and 26 and allow the detector heads 16 and 26 to move radially inward and outward. Each individual detector head 16 and 26 may individually rotate clockwise or counterclockwise about its own axis, and both detector heads 16 and 26 may individually rotate about a common center of axis along the gantry structure 12 and 22.

As shown in FIG. 1A, an open gantry structure system 10 includes a table 18 placed parallel to the gantry structure 12. Typically, the gantry structure 12 is free to traverse along a fixed track 14 such that the detector heads 16 traverse over the long axis of a patient (not shown) supported on the table 18 during ECT or total body clinical scan sessions. When used with the open gantry system 10, an exchange assembly (not shown) of the present invention is typically located at one end of the track 14.

FIG. 1B illustrates a closed gantry structure system 20. The closed gantry structure system 20 comprises a table 28 placed perpendicular to the gantry structure 22. Typically, the table 28 is free to traverse along a track 24 such that the table 28 positions the patient (not shown) between the detector heads 26. This position allows the detector heads 26 to traverse over the long axis of a patient (not shown) supported on the table 28 during ECT or total body clinical scan sessions as the table 28 slides the patient through the opening 25 of the gantry structure 22. When used with the closed gantry system 20, an exchange assembly (not shown) of the present invention is typically located adjacent to one side of the gantry structure 22. Note that further discussion of the present invention will be discussed in view of use with the closed gantry structure system 20 of FIG. 1B.

During a typical imaging study using a closed gantry structure (each individual collimator weighs approximately 400 lbs), the patient is injected with a radiopharmaceutical. The detector heads 26 then revolve around and across the length of the patient. Each of the detector heads 26 utilize a collimator placed on the inner face of the detector head 26 to respond to the incident emissions from the radiopharmaceutical injected into the patient. The collimators collimate the incident radiation emissions and filter out certain types of unwanted emissions. The collimators are exchanged with other collimators having different characteristics when beginning a different imaging study.

Due to the extreme weight of each individual collimator, the imaging study technician has great difficulty in exchanging (or switching) collimators between studies. First, the actual transfer of the collimators from their storage rack (where they are stored when not in use) to the detector heads typically requires assistance from at least one other individual. Thus, the technician typically moves the storage rack containing the collimators not in use into a close proximity to the detector heads prior to transferring the collimators. However, a storage rack containing multiple collimators is typically extremely difficult to maneuver, even when on wheels. As a result, a technician must often call for assistance in positioning the collimator storage rack near the detector heads. Thus, a method of automatically position a collimator storage rack near the detector heads of a gantry structure would be advantageous.

The present invention is comprised of a collimator exchange assembly used to automatically position the collimators proximate to the detector heads such that the collimators may be easily and efficiently exchanged. The collimator exchange assembly of the present invention includes a rack having multiple parallel and stacked drawers (or trays, shelves, etc.). Collimators not in use are stored in the drawers in the rack. Each collimator pair is stored within the rack such that its relative position within the rack corresponds with the operating position of the detector heads when that particular collimator pair is in use.

Figure 2A:
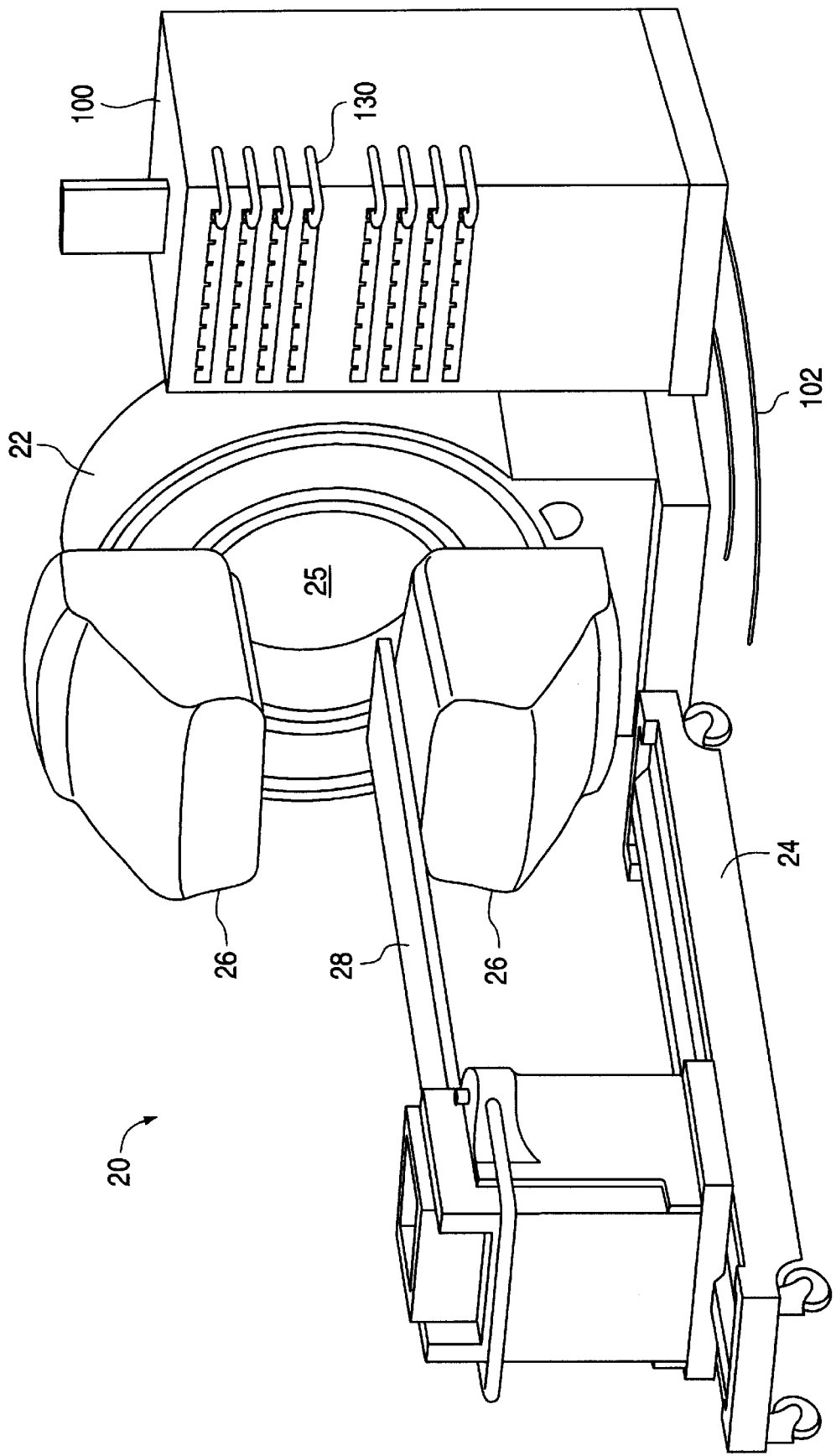
FIG. 2A is a pictorial illustration of the exchange assembly of the present invention as used with a closed gantry structure.

FIG. 2A is a pictorial illustration of the exchange assembly 100 of the present invention as used with a closed gantry structure system 20, such as the one illustrated in FIG. 1B. FIG. 2B is a top view of the exchange assembly 100 and closed gantry structure system 20 illustrated in FIG. 2A. In both FIG. 2A and 2B, the exchange assembly 100 is positioned at one side of the gantry structure 22 and is shown in the "at rest" or "during operation" position. Tracks 102 provide a path along which the exchange assembly 100 may travel to position itself in close proximity with the detector heads 26 for the actual exchange of the collimators. Note that although the exchange assembly 100 is shown positioned to one side of the gantry structure 22, the exchange assembly 100 may be located in any one of numerous places, including but not limited to either side of the gantry structure, resting atop the gantry structure, or even stored away from the gantry structure 22 and having a set of tracks or other means for positioning the exchange assembly 100 adjacent to the detector heads 26 for the exchange of the collimators.

Figure 2C:
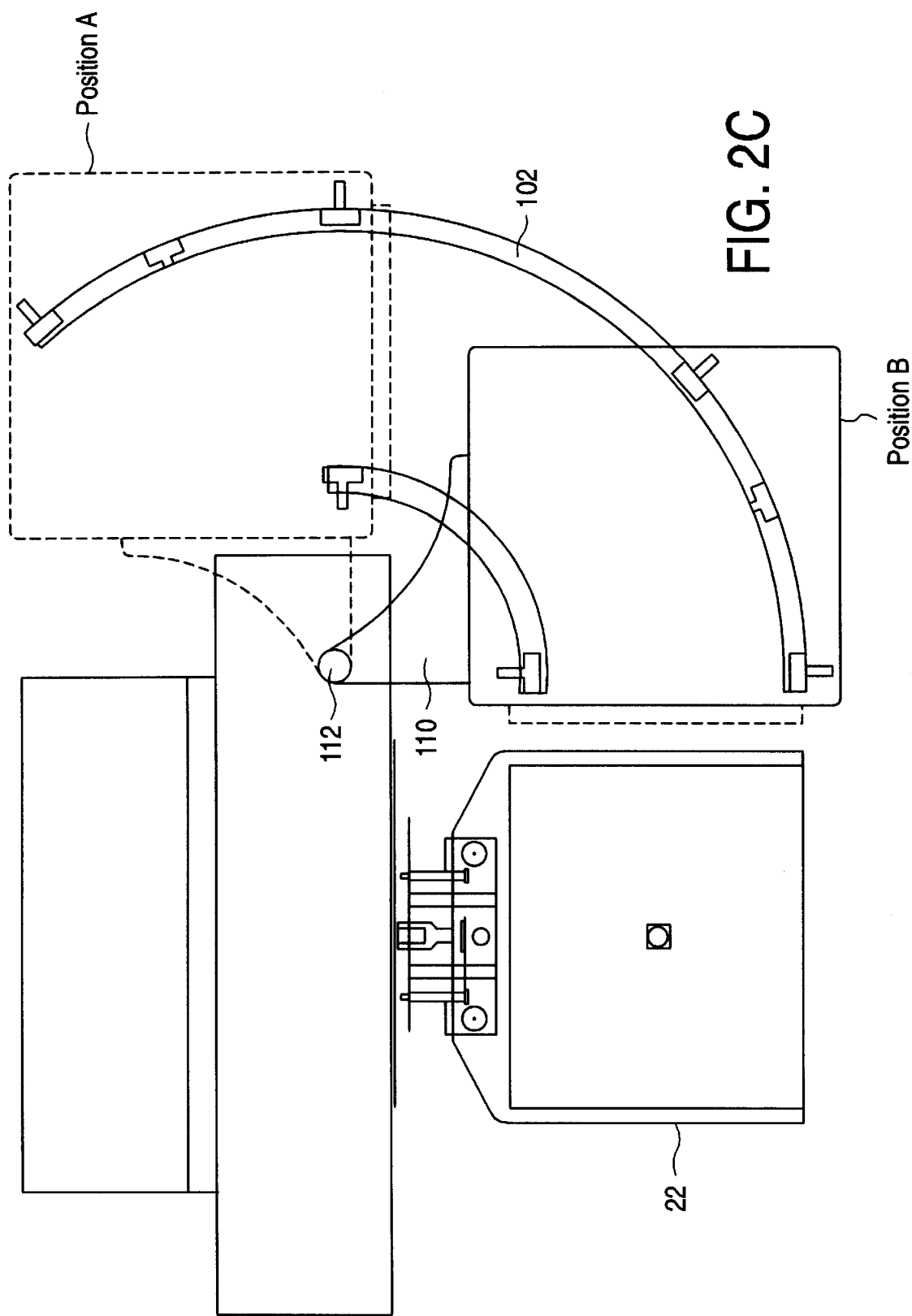
FIG. 2C is a bottom view of the exchange assembly and gantry structure illustrated in FIG. 2A.

In the preferred embodiment, the exchange assembly 100 is located adjacent to one side of the gantry structure 22. FIG. 2C shows a bottom view of the exchange assembly 100 coupled to the gantry structure 22. A base support 110 couples the exchange assembly 100 to a rigid pivot shaft 112 located at one end of the gantry structure 22. During operation of the gamma camera system, the exchange assembly 100 is positioned to the side of the gantry structure 22 in Position A (shown by dashed lines) such that it does not interfere with operation of the gamma camera system. To transfer or exchange collimators, a vehicle (not shown) housed within the base of the exchange assembly 100 then moves the exchange assembly 100 into proximity with the detector heads 26 on gantry structure 22. In the preferred embodiment, the vehicle rotates the exchange assembly 100 about pivot shaft 112 into Position B. At Position B, the exchange assembly 100 is located in close proximity to the detector heads 26 to facilitate the transfer of collimators from the exchange assembly 100 to the detector heads 26. Note that the actual proximity of exchange assembly 100 to detector heads 26 while in Position B is a design decision typically determined by the method of transfer to be used in transferring collimators between the exchange assembly 100 and the detector heads 26. However, in the preferred embodiment, the exchange assembly 100 resides within approximately 1 inch of the detector heads 26 while in Position B.

Figure 3B:
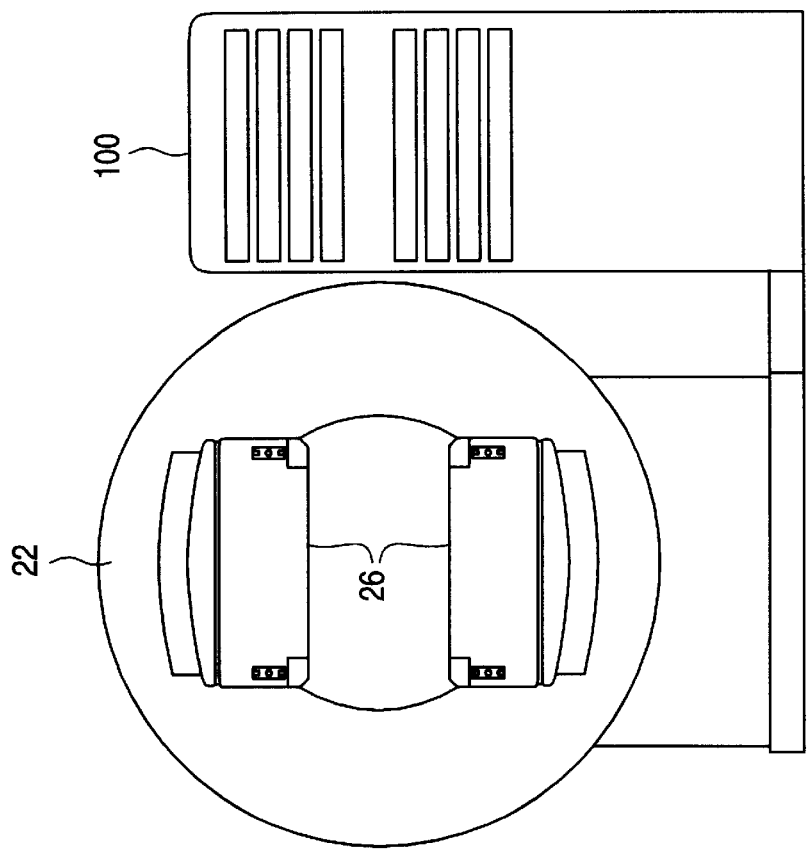
FIG. 3B is a front view of the exchange assembly and the gantry structure of FIG. 2A wherein the exchange assembly is in the at rest position (Position A).
Figure 3A:
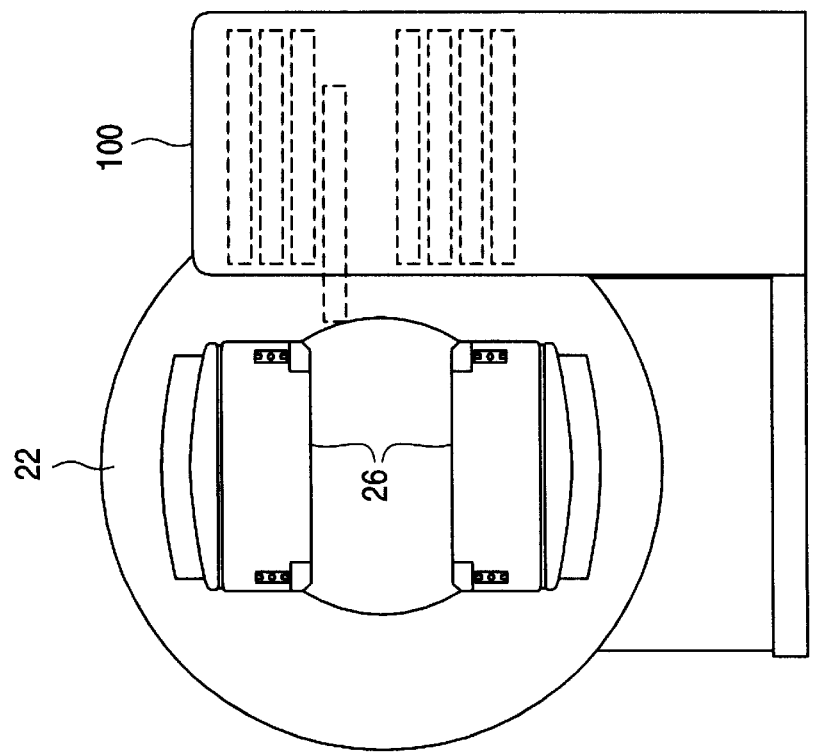
FIG. 3A is a front view of the exchange assembly and the gantry structure of FIG. 2A wherein the exchange assembly is in the transfer position (Position B).

FIGS. 3A and 3B show side views of the exchange assembly 100 coupled to the gantry structure 22. FIG. 3A shows the exchange assembly 100 in position to transfer collimators between the exchange assembly 100 and the detector heads 26 of the gantry structure 22 (see Position B of FIG. 2C). FIG. 3B shows the exchange assembly 100 during operation of the gamma camera study, wherein the exchange assembly 100 is located at the side of the gantry structure 22 such that the exchange assembly 100 does not interfere with the gamma camera study (see Position A of FIG. 2C). Note that although the exchange assembly 100 is shown coupled to the right side of the gantry structure 22, the exchange assembly 100 could also easily be coupled to the left side of the gantry structure 22.

Movement of the exchange assembly 100 into position for transfer of the collimators is controlled by a vehicle (not shown) typically housed within the base of the exchange assembly 100. Tracks 26 (shown most clearly in FIG. 2) may be used by the vehicle to facilitate the rotation of the exchange assembly 100 into position for the transfer of the collimators. In the preferred embodiment, the vehicle comprises a drive shaft that progresses along track 102 such that the exchange assembly 100 is rotated about pivot shaft 112 from Position A to Position B and back again to Position A. Methods of rotating a housing about a fixed point are known in the art and many ways other than the one described above may be used. For example, a motor with or without a gear system reduction could rotate the exchange assembly 100 about a fixed pivot shaft 112. Alternatively, the exchange assembly 100 could be fixedly coupled to pivot shaft 112 and the motor could rotate the pivot shaft 112 itself. The rotation of the exchange assembly 100 about the pivot shaft 112 could also be manual or automatic in manual operation.

The presence of tracks 102 is there purely to facilitate the rotation of the exchange assembly 100. When used, tracks 102 typically have wheel bearings to allow the exchange assembly 100 to smoothly traverse along the tracks 102. However, the tracks 102 could be removed from the system and the exchange assembly 100 have a plurality of wheels coupled to the bottom surface of the exchange assembly 100 to facilitate the rotation. Thus, the method used to position the exchange assembly 100 proximate to the detector heads 26 is not critical, as long as the positioning of the exchange assembly 100 with respect to the detector heads 26 on the gantry structure 22 may be consistently and accurately repeated during each transfer of collimators between the exchange assembly 100 and the detector heads 26.

Note that it is not required that the pivot shaft 112 about which the exchange assembly 100 rotates be located on the gantry structure 22. For example, the position of the exchange assembly 100 relative to the gantry structure 22 will often be dictated by the size and shape of the room or facility housing the gamma camera system. At times, it may be more convenient for the exchange assembly 100 to be stored at a location away from the gantry structure 22 rather than adjacent to the gantry structure 22. In such case, the exchange assembly 100 may be moved into position for transfer of the collimators 1) by rotation about a fixed point located between the exchange assembly 100 and the gantry structure 22, 2) by sliding into position along a fixed track, or 3) by a combination of the sliding and rotating movements. However the exchange assembly 100 is positioned proximate to the gantry structure 22, it is preferred that the position of the exchange assembly 100 be controlled by the same system tracking the position and movement of the gantry structure 22 and detector head 26 placements and locations. A common control system will ensure consistent, accurate, and repeatable placement of the exchange assembly 100 with the gantry structure 22 during transfer of the collimators between the exchange assembly 100 and the detector heads 26 of the gamma camera system 20.

In this manner, the positioning of the exchange assembly 100 relative to the dual detector heads 26 of the gamma camera system 20 may be automated to further simplify the transfer of collimators from the exchange assembly 100 to the detector heads 26. The automated initial positioning of the exchange assembly 100 eliminates the need for manual alignment of the exchange assembly 100 with the gantry structure 22 by a gamma camera study technician. The automatic alignment of the exchange assembly 100 not only reduces the need for personnel intervention, thus reducing the time and cost associated with a gamma camera study, but also reduces the risk of the exchange assembly 100 being misaligned or incorrectly positioned in relation to the gantry structure 22. These factors contribute to an improved quality, reproducibility, and precision of data collected (and the resultant image) during a gamma camera study when using the present invention. The exchange assembly 100 of the present invention not only improves the quality, reproducibility, and precision of data collected during a gamma camera study, but also significantly alleviates several safety issues that arise when an individual attempts to manually move a collimator storage rack or transfer an individual collimator (recall that an individual collimator weighs approximately 400 lbs).

Once the exchange assembly 100 has been rotated into Position B for transferring the collimators between the exchange assembly 100 and the detector heads 26 of the gantry structure 22, the actual collimator exchange process may begin. One method of transferring collimators between the exchange assembly 100 and the detector heads 26 is described in U.S. Pat. No. 5,519,223(Patent'223), issued May 21, 1996 to Hug et al., entitled "Apparatus and Method for Automated Collimator Exchange", and is incorporated herein by reference.

Figure 4:
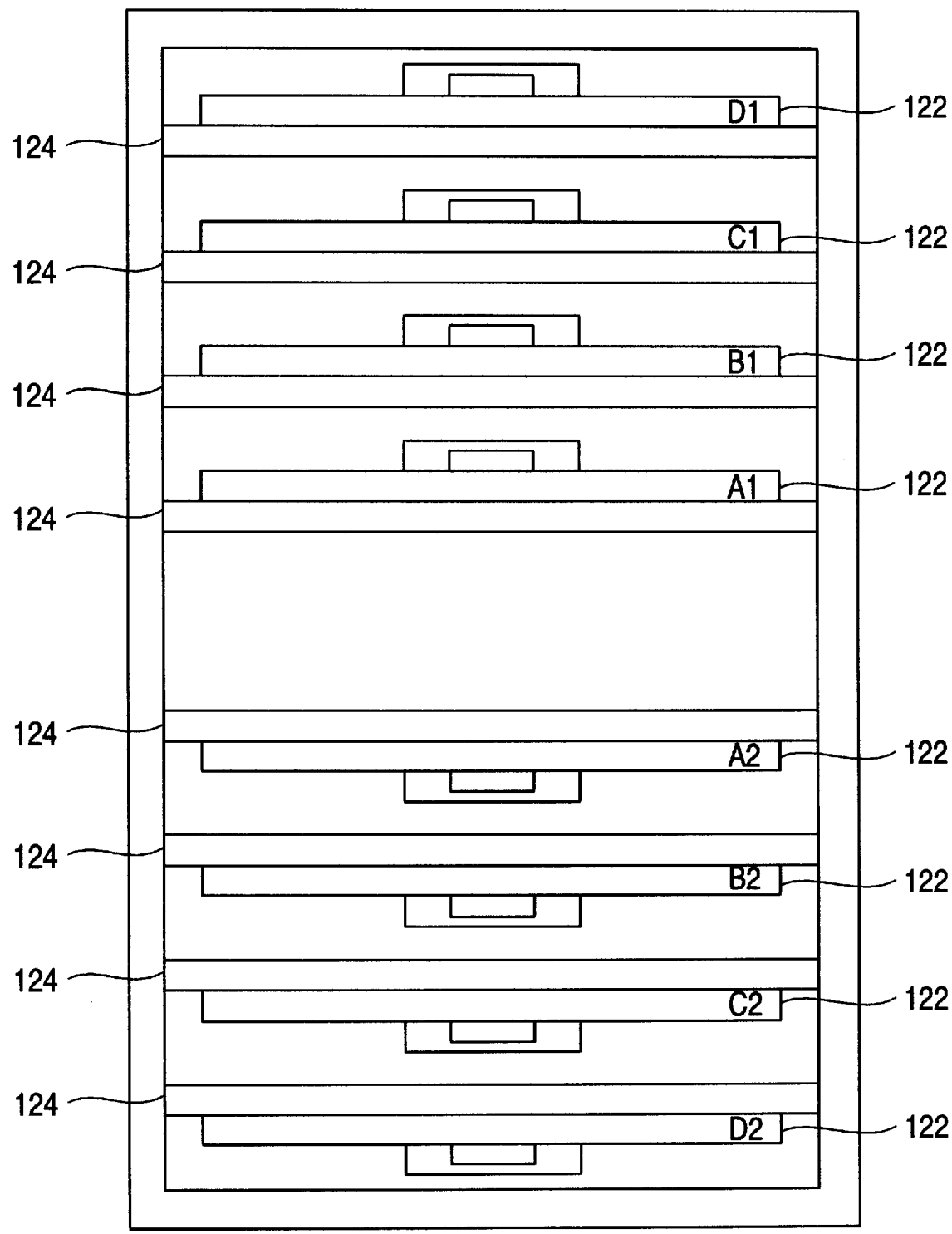
FIG. 4 is a front view of the storage rack of the exchange assembly of the present invention.

In one embodiment of the exchange assembly 100 of the present invention, shown in FIG. 4, the exchange assembly 100 is comprised of a collimator storage rack 120 having multiple parallel and stacked drawers (also called trays, tray mechanisms, drawer mechanisms, shelves, etc.) 122 for holding pairs of collimators 124. The collimators 124 are typically placed within the rack 120 according to their respective operating positions. Note that the operating position (i.e., the position of the detector heads 26 relative to one another during the gamma camera study) is determined by the type of study and the specific collimators being used. For example, when using collimator pair A (comprising collimator A1 and collimator A2), the detector heads 26 typically operate at their furthest point radially inward. Thus, collimator pair A is stored in the central two drawers 122A1 and 122A2 of storage rack 120 such that the position of collimator pair A within the storage rack 20 and the operating position of the detector heads 26 when using collimator pair A correspond. Likewise, when using collimator pair D (comprising collimator D1 and collimator D2), the detector heads 26 typically operate at their furthest point radially outward. Thus, collimator pair D is stored in the top and bottom drawers 122D1 and 122D2 of storage rack 120. More or fewer drawers 122 could be implemented within the scope of the present invention, and an eight tray embodiment is selected merely because it allows four different pairs of collimators 124 for a dual head system, which appears to meet the needs of most (if not all) nuclear imaging systems. Further, although the drawers 122 holding the collimators 124 are positioned within the storage rack 120 horizontally and the collimator transfer is discussed with the collimators 124 and detector heads 26 positioned for a horizontal transfer, it should be noted that the collimators 124 could easily be stored in a vertical position within a storage rack to allow a vertical transfer of the collimators.

Once the exchange assembly 100 is positioned in close proximity with the gantry structure 22 for transferring collimators, and the detector heads 26 are in position to receive or release a particular pair of collimators, the exchange itself may take place. Because the collimator pairs are positioned within the storage rack 120 of the exchange assembly 100 according to the corresponding operating position of the detector heads 26 for use of that particular pair of collimators in a gamma camera study, a direct transfer from the storage rack 120 to the detector heads 26 is possible. First, the detector heads 26 are moved to the loading/unloading position. Then, the gamma camera study technician pulls out the safety pins 120 (see FIG. 2A) that hold the drawers 122 in place. The safety pins 130 are typically spring loaded pins used to either securely hold the drawers 122 within the storage rack 120 or lock the drawers 122 into position when extended (i.e. the drawers 122 cannot be stopped when extended halfway from the storage rack 120). Note also that sensors may be placed along the drawers such that the control system can monitor the location of the drawers and collimators at all times Once the pins 130 are removed, the selected drawers 122 slide out from the storage rack 120 along rails supported by bearings used to facilitate a smooth transition of the collimators from the storage rack 120 to the detector heads 26. Each drawer 122 is moved from the storage rack 120 along the drawer rails by an actuator, such as a lead screw, positioned along the drawer rails. Note also that a motor is used to lift each drawer to facilitate the actual transfer of the collimator between the storage rack 120 and the detector heads 26. For example, when transferring a collimator to the lower detector head 26 from the lower half of the storage rack 120, the lower head motor lowers the collimator into position to engage the lock plates (or locking mechanisms) of the lower detector head 26. Similarly, when transferring a collimator to the upper detector head from the upper half of the storage rack 120, the upper head motor raises the drawer and collimator into position to engage the lock plates of the upper detector head 26.

Once the drawers 122 are fully extended, the collimators are positioned over each respective detector head 26, and the motors position the collimators against the inward facing side of each detector head 26, sliding lock plates (or other locking mechanisms) located on the inward facing side of detector head 26 are then engaged by the locking mechanisms located on the corresponding face of each collimators. Once the sliding lock plates are engaged by the collimators' locking mechanisms, latch pins 130 drop into place and secure the collimators 124 to the detector heads 26. In this manner, the collimators 124 may simultaneously be transferred directly from the drawers 122 of the storage rack 120 to the detector heads 26.

The control system of the gamma camera system 20 as used with the present invention may be composed of a gantry computer system for control of the gantry, a Pegasys™ computer system for image data processing and display, and an exchange controller system for control of the exchange assembly 100. The exchange controller system controls all movement and tracking of the exchange assembly 100, including the initial positioning of the exchange assembly 100, the transfer of collimators 124, and the repositioning of the exchange assembly 100 to prevent interference with the gantry structure 22 during operation of the gamma camera system 20. In the transfer of collimators 124, the exchange controller system controls the movement (or extension) of the drawers 122 carrying the collimators 124, and the lock, unlock, and latch sensor inputs during all gantry operations to insure secure attachment of the collimators 124 before removing the support of the drawers 126 or beginning operation of the gamma camera system 20.

The gantry computer system controls the exchange controller system as well as all motion of the detector heads 26 and the gantry structure 22 in general. The gantry computer system also controls the collection of imaging information during an imaging session and transfers that information to the Pegasys™ computer system which processes the data and performs ECT reconstruction of the image data and other image processing functions which are not described in detail because they are not entirely pertinent to the present invention. Any well-known nuclear camera image processing and display computer system may be advantageously used by the gamma camera system 20 and exchange assembly 100 of the present invention.

The exchange control system is similar to that discussed in Patent'223, including emergency stop switches, position sensors, and limit checking. However, the exchange control system has been simplified over Patent'223 by the elimination of the carriage, elevator, and bridge. The carriage, elevator, and bridge control systems and their motors, potentiometers, and controllers are no longer required. Instead, the exchange control system now includes only two motor control components: an exchange assembly motion controller and a collimator drawer controller. It is appreciated that any of a number of well-known and commercially available hardware motor controllers may be used within the present invention. The assembly motion controller is preferably coupled to a DC motor that rotates the exchange assembly 100 about the pivot shaft 112 into proximity with the detector heads 26 for transfer of the collimators 124. A potentiometer coupled to the motor indicates the exchange assembly 100 position. The collimator drawer controller is also coupled to a DC motor, which extends the drawers 126 from the storage rack 120 to facilitate the collimator transfer. A potentiometer is coupled to the collimator tray controller and relays motor status information (voltage and enable) to the exchange controller.

The specifics of the gantry computer system are discussed in detail in U.S. Patent'223. The major processing tasks executed by the gantry computer system necessary to perform the collimator exchange remain the same, with the transfer of the collimators between the exchange assembly 100 and the detector heads 26 further simplified to eliminate use of a carriage, bridge and elevator. As with Patent'223, one collimator may be selected to load onto a single detector head, or alternatively, two collimators may be selected for loading on dual detector heads.

The preferred embodiment of the present invention, an automated collimator exchange device (assembly) and method for use in positioning the exchange assembly in proximity with the detector heads of a gamma camera system and then transferring a pair of collimators (or a single collimator) between the exchange assembly and the detector heads, is thus described. The automated positioning and alignment of the exchange assembly eliminates the need for a gamma camera technician to manually position the exchange assembly near the gantry structure of the gamma camera system for transfer of the collimators. The present invention also results in a more consistent alignment process by repeatedly returning the exchange assembly to the same position for the exchange process.

The present invention provides several advantages over the prior art. First, the exchange process itself is further simplified. Second, the automated position of the collimator storage rack in proximity with the detector heads eliminates the need for the gamma camera technician to manually position the exchange assembly near the gantry structure. This will eliminate many of the safety concerns previously associated with the manual transfer of collimators between the storage rack and the detector heads, in addition to the sheer strength required by an individual to position the storage rack in position for the transfer of collimators. Further, an automatic positioning of the exchange assembly will result in a more consistent alignment process by consistently returning the exchange assembly to the same position for the exchange process. Each of the above described advantages combine to result in a more cost-effective and efficient method of exchanging collimators, while also improving the quality and reproducibility of data collected during a gamma camera study.

I claim:

1. An apparatus for aligning a collimator storage rack with a detector head supported by a gantry structure of a gamma camera system, comprising:
   a collimator storage rack coupled to said gantry structure to allow said collimator storage rack to be selectively positioned proximate to said detector head for transferal of a collimator between said collimator storage rack and said detector head, or to be positioned away from said detector head.

2. The apparatus of claim 1 wherein said collimator storage rack is positioned within approximately one inch of said detector to transfer a collimator between said collimator storage rack and said detector head.

3. The apparatus of claim 1 wherein said collimator storage rack is coupled to a shaft and said collimator storage rack rotates about said shaft into position with said detector head.

4. The apparatus of claim 3 wherein said shaft is coupled to said gantry structure.

5. The apparatus of claim 1 further comprising a set of tracks, wherein said collimator storage rack traverses along said tracks proximate to said detector head to transfer a collimator between said collimator storage rack and said detector head, and traverses back along said tracks away from said detector head prior to operation of said gamma camera system.

6. An apparatus for aligning a collimator storage rack with a detector head supported by a gantry structure of a gamma camera system, comprising:
   a collimator storage rack; and
   a vehicle, said vehicle for positioning said collimator storage rack proximate to said detector head wherein said collimator storage rack is coupled to a shaft, and said vehicle rotates said collimator storage rack about said shaft proximate to said detector head to transfer a collimator between said collimator storage rack and said detector head, said vehicle rotates said collimator storage rack away from said detector head.

7. The apparatus of claim 6 wherein said shaft is coupled to said gantry structure.

8. An apparatus for aligning a collimator storage rack with a detector head supported by a gantry structure of a gamma camera system, comprising:
   a collimator storage rack;
   a vehicle, said vehicle for positioning said collimator storage rack proximate to said detector head; and
   a track along which said vehicle traverses to position said collimator storage rack proximate to said detector head to transfer a collimator between said collimator storage rack and said detector head, and back along which said vehicle traverses away from said detector head.

9. An apparatus for transferring a collimator between an imaging surface of a detector head and a collimator storage rack, said detector head supported by a gantry structure, said apparatus comprising:
   a collimator storage rack coupled to a shaft and said collimator storage rack rotates about said shaft into position with said detector head;
   a vehicle, said vehicle for positioning said collimator storage rack proximate to said detector head;
   a tray within said collimator storage rack, said tray for moving said collimator from said collimator storage rack to said detector head; and
   a lock plate coupled to said detector head for coupling said collimator to said imaging surface of said detector head and for removing said collimator from said imaging surface.

10. The apparatus of claim 9 wherein said shaft is coupled to said gantry structure.

11. An apparatus for transferring a collimator between an imaging surface of a detector head and a collimator storage rack, said detector head supported by a gantry structure, said apparatus comprising:
    a collimator storage rack;
    a vehicle, said vehicle for positioning said collimator storage rack proximate to said detector head;
    a tray within said collimator storage rack, said tray for moving said collimator from said collimator storage rack to said detector head;
    a lock plate coupled to said detector head for coupling said collimator to said imaging surface of said detector head and for removing said collimator from said imaging surface; and
    a track along which said vehicle traverses to position said collimator storage rack proximate to said detector head to transfer a collimator between said collimator storage and said detector head, and back along which said vehicle traverses away from said detector head.

12. A nuclear camera system, comprising:
    a detector head having an imaging surface for detecting emissions, said detector head on a gantry structure;
    a computer system for receiving and processing information collected by said detector head;
    a collimator storage rack for storing a plurality of collimators, said collimator storage rack is coupled to a shaft;
    a vehicle for positioning said collimator storage rack proximate to said detector head, said vehicle rotates said collimator storage rack about said shaft into position proximate to said detector head to transfer a collimator between said collimator storage rack and said detector head, and said vehicle rotates said collimator storage rack away from said detector head;
    a tray within said collimator storage rack, said tray for moving a collimator from said collimator storage rack to said detector head; and
    a lock plate coupled to said detector head for coupling said collimator to said imaging surface of said detector head and for removing said collimator from said imaging surface.

13. The nuclear camera system of claim 12 wherein said shaft is coupled to said gantry structure.

14. A nuclear camera system, comprising:
    a detector head having an imaging surface for detecting emissions-, said detector head on a gantry structure;
    a computer system for receiving and processing information collected by said detector head;
    a collimator storage rack for storing a plurality of collimators, said collimator storage rack is coupled to a shaft;
    a vehicle for positioning said collimator storage rack proximate to said detector head, said vehicle rotates said collimator storage rack about said shaft into position proximate to said detector head to transfer a collimator between said collimator storage rack and said detector head, and said vehicle rotates said collimator storage rack away from said detector head;
    a tray within said collimator storage rack, said tray for moving a collimator from said collimator storage rack to said detector head; and
    a lock plate coupled to said detector head for coupling said collimator to said imaging surface of said detector head and for removing said collimator from said imaging surface; and
    a track along which said vehicle traverses to position said collimator storage rack and said detector head, and back along which said vehicle traverses away from said detector head.

15. A method of transferring a collimator from a collimator storage rack to a detector head, said detector head supported by a gantry structure, comprising the steps of:
    coupling said collimator storage rack to the gantry structure;
    positioning said collimator storage rack coupled to the gantry structure proximate to said detector head;
    extending a tray from said collimator storage rack to said detector head, said tray supporting said collimator;
    engaging a locking mechanism on said detector head with said collimator such that said collimator is coupled to said detector head;
    returning said tray to said collimator storage rack; and
    positioning said collimator rack away from said detector head.

16. An apparatus for aligning a collimator storage rack with a detector head supported by a gantry structure of a gamma camera system, comprising:
    a collimator storage rack coupled to the gantry; and
    means for positioning said collimator storage rack proximate to said detector head wherein said collimator storage rack is coupled to the gantry with a shaft, and said means for positioning said collimator storage rack rotates said collimator storage rack about said shaft proximate to said detector head to transfer a collimator between said collimator storage rack and said detector head, and said means for positioning said collimator storage rack rotates said collimator storage rack away from said detector head.

17. The apparatus of claim 16 wherein said shaft is coupled to said gantry structure.

18. An apparatus for aligning a collimator storage rack with a detector head supported by a gantry structure of a gamma camera system, comprising:

a collimator storage rack coupled to the gantry; and means for positioning said collimator storage rack proximate to said detector head; and a track along which said means for positioning said collimator storage rack traverses to position said collimator storage rack proximate to said detector head to transfer a collimator between said collimator storage rack and said detector head, and back along which said means for positioning said collimator storage rack traverses away from said detector head.

* * * * *